A. D. WELKER & L. E. SNYDER.
POTATO PLANTER.
APPLICATION FILED JULY 23, 1915.
1,171,682.
Patented Feb. 15, 1916.
2 SHEETS—SHEET 1.
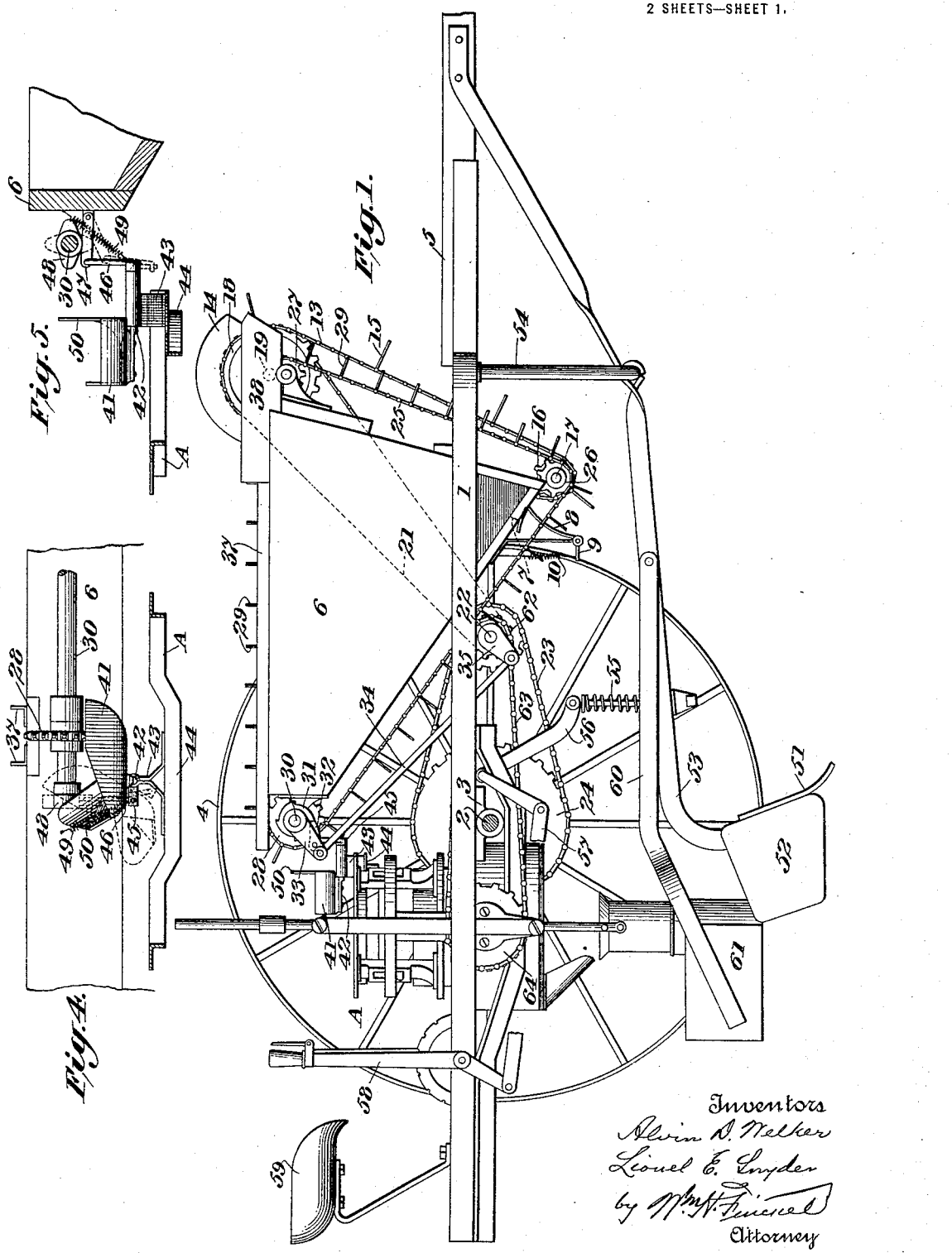

A. D. WELKER & L. E. SNYDER.
POTATO PLANTER.
APPLICATION FILED JULY 23, 1915.
1,171,682.
Patented Feb. 15, 1916.
2 SHEETS—SHEET 2.
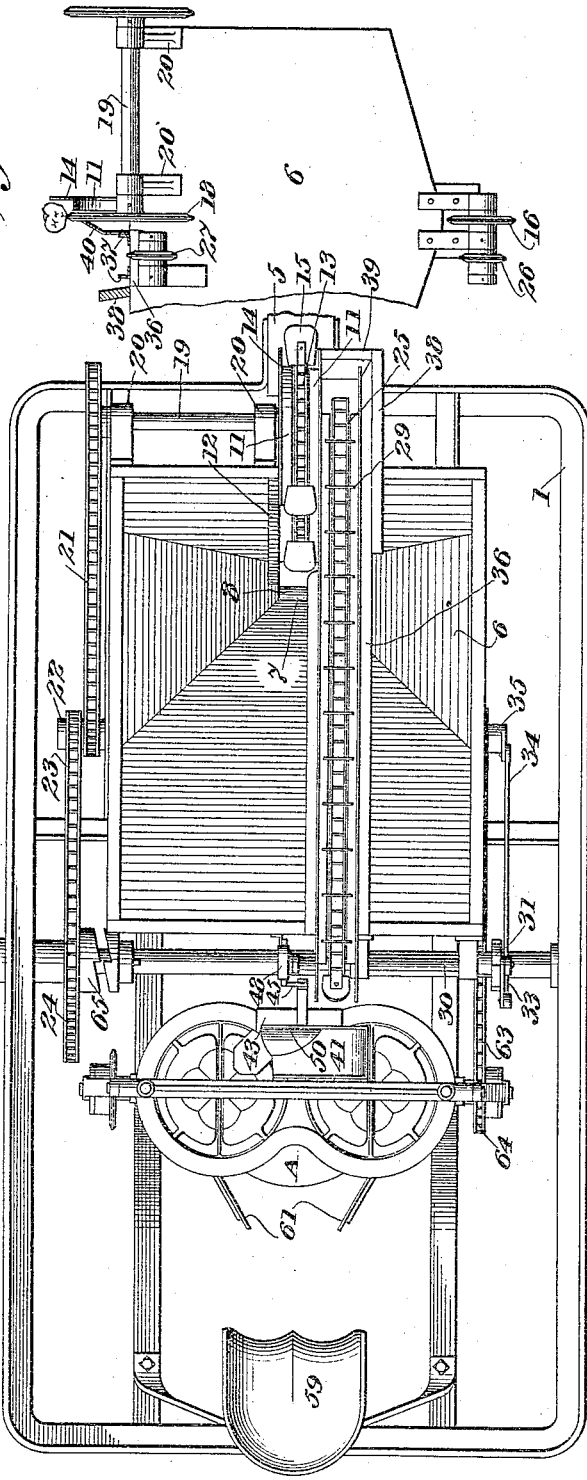
Inventors
Alvin D. Welker
Lionel E. Snyder
by W. H. Finckel
Attorney

UNITED STATES PATENT OFFICE.

ALVIN D. WELKER AND LIONEL E. SNYDER, OF WADSWORTH, OHIO.

POTATO-PLANTER.

1,171,682.  Specification of Letters Patent.  Patented Feb. 15, 1916.

Original application filed February 27, 1915, Serial No. 11,095. Divided and this application filed July 23, 1915. Serial No. 41,495.

*To all whom it may concern:*

Be it known that we, ALVIN D. WELKER and LIONEL E. SNYDER, citizens of the United States, residing at Wadsworth, in the county of Medina and State of Ohio, have invented a certain new and useful Improvement in Potato-Planters, of which the following is a full, clear, and exact description.

The object of this invention is to provide a machine for cutting, dropping and planting potatoes accurately and with little or no waste, regardless of the speed at which the machine may be operated. Horse-drawn planters are subjected to variations in speed owing to the gait of the draft animals, and it is not convenient and in some cases it is impossible to gear the machine to adapt its operating parts to differences in speed of the draft animals, so as to insure regular and uniform operation without waste.

In a prior invention patented April 15, 1913, No. 1,058,821, we used a single cutting box, and while this proved to be very successful in actual use, it was found that when the draft animals unduly quickened their pace, the cutting and dropping of the potatoes were not satisfactory. Primarily the present invention is designed to remedy this difficulty by the provision of a double cutting box and a feed mechanism for properly supplying it with potatoes to be cut. The double cutting box and its accessories remain as the invention in our case filed February 27, 1915, Serial No. 11,095, (patented November 23, 1915, No. 1,161,560), while the feed mechanism of said case forms the subject of this present case and is divided from said parent case in accordance with the requirement of the Patent Office.

In the accompanying drawings illustrating the invention, in the several figures of which like parts are similarly designated, Figure 1 is a side elevation with the near wheel removed and its axle in section, illustrating one example of the invention in a substantially complete machine and Fig. 2 is a top plan view thereof. Fig. 3 is a front elevation and partial cross-section of the hopper and carrier chain supports. Fig. 4 is a rear elevation of a receiver to deliver the potatoes from the supply mechanism to the cutting and dropping mechanism. Fig. 5 is an elevation at right angles to and corresponding to Fig. 4.

It will be understood that it is not intended to limit the invention to any particular division of the double cutting box and the chambers; and yet the invention may be most easily used by following the construction disclosed in the parent case. So also the invention is not limited to details of construction. All these and other variations are intended to be within the scope of the claims herein.

1 is the main frame, of substantially rectangular construction, and most conveniently made of angles or channels.

2 is the wheel axle mounted in bearings 3 on the frame, and carrying a pair of wheels 4 by which the machine may be transported.

5 is a tongue to which a team may be hitched for transporting the machine in use, but any machine-moving agency may be employed. The wheels 4 and their axle 2 afford the means for driving the various parts of the mechanism.

A hopper 6, of triangular shape in elevation and having converging sides and ends, has an opening 7 made in it at the point of convergence of its sides and ends.

8 is a gate erected beneath the hopper opening 7 and having a tail 9 acted upon by a spring 10 which normally tends to throw the gate into closing position with respect to the opening 7.

At the front end of the hopper is arranged a track in line with the opening 7, and this track is made up of the front end of the hopper on which parallel strips 11 are laid and parallel upstanding side pieces 12, and these parts extend from the bottom of the hopper to its top, one of the strips 11 being extended above the top edge of the hopper and bent to a curve paralleling the path of chain 13 in extent about one-third around the circumference of the sprocket wheel, presently described, which supports said chain, and at the top of the side next to the extended strip is an upstanding extension 14 having a curvature similar to that of the strip and ending with it, and serving as an outside shield, the purpose of which will appear later on. The strips 11 form a groove in which runs the elevator chain 13. This chain has fixed to it the carriers 15 by which the potatoes are elevated. The chain 13 is mounted upon an idler sprocket wheel 16 arranged upon a countershaft 17 at the bottom of the hopper, and upon a larger driving sprocket wheel 18 mounted upon a shaft 19 which is supported in brackets 20 on the hopper and driven by a chain 21 from a countershaft 22 which is mounted in bearings upon the main frame and is connected by chain 23 with a sprocket wheel 24 on the axle 2, so that the carrier chain 13 has an endless rotary motion from bottom to top of the hopper. As will be seen by reference to Fig. 1, the carrier chain runs through the hopper in the upward direction, from bottom to top. This chain with its carriers is herein also referred to as the elevator.

A second carrier chain 25 is mounted alongside of the elevator and parallel with it, and it is supported upon an idler sprocket wheel 26 at the bottom of the hopper on the same shaft as the sprocket wheel 16 and upon an idler sprocket wheel 27 at the upper end of the hopper and upon a driving sprocket wheel 28 at the rear upper end of the hopper, so that this carrier chain 25 surrounds the hopper and is arranged outside thereof. This carrier chain is provided with carriers 29 spaced apart a distance sufficient to take a single potato as it is transferred from the elevator. This chain 25 with its carriers 29 is herein referred to also as the conveyer. The conveyer is given an intermittent or step by step motion from the sprocket wheel 28 which is mounted on the shaft 30 supported in bearings at the upper rear end of the hopper, the shaft 30 of said sprocket wheel being provided at its outer end with a ratchet 31 adapted to be engaged by a pawl 32 carried on a crank arm 33 which is loosely mounted on the shaft 30, said crank arm being connected by a rod 34 with a crank arm 35 on the countershaft 22, which, as already stated, is driven from the wheel axle 2.

The conveyer passes over the top of the hopper in a track or trough composed of a base 36 on which are erected the angle pieces 37. As will appear from comparison of Figs. 1, 2, and 3, a potato carried up by the elevator will be deflected therefrom by the extension 14 onto the horizontal portion of the conveyer as said elevator makes its turn out of the hopper. The space above the hopper and adjacent to the upper meeting ends of the two carrier chains is inclosed by the walls 38, 39, 40, and these walls together with the bottom or base 36 of the track or trough for the conveyer form a receiving box for permitting the discharge of the elevated potatoes onto the horizontal portion of the conveyer and the return of any surplus potatoes to the hopper as said conveyer moves out of said receiving box over the open upper end or top of the hopper toward its rear. The carriers 15 and 29 are rounded so as to avoid injury to the potatoes, and also to prevent them from lodging upon their edges. The gate 8 and the chain 13 being alined, it follows that as the carriers 15 successively approach the hopper opening 7 for ascending through the hopper, they come into contact with the gate and open it until they pass into the hopper.

Next to the rear end of the horizontal portion of the conveyer is a scoop-like tilting receiver 41, which receives the potatoes, one at a time from the conveyer and deposits them in the cutting apparatus. This receiver is mounted upon a rock-shaft 42 supported in a bracket bearing 43 rising from a dropped down portion 44 of the top frame piece of the cutting apparatus herein referred to, and said shaft is applied to the receiver off its center, so that the receiver may be most easily righted after having been tilted to discharge a potato. The shaft 42 has a crank arm 45 fixed to it, and this crank arm is connected by rod 46 with a lever or tappet arm 47 pivoted to the hopper and acted upon by a two-point wiper cam 48 on the shaft 30, so as periodically to rock the shaft 42 and thereby tilt the receiver. In order to assist the return of the receiver, a spring 49 may be interposed between the crank arm 45 and some fixed part of the machine, as the hopper wall. The bottom of the receiver is sloped as indicated by the full lines, Fig. 4, and dotted lines Fig. 5, and its discharge end has an extended lip 50 to guide the discharging potato into the cutting box.

Beneath the receiver 41 is a double cutting apparatus, to which the potatoes are delivered one at a time, and by which they are cut into four, more or less, pieces, and whence the pieces are discharged to the planting mechanism forming part of the machine. This cutting apparatus is retained as the subject of the parent case and reference is made to that case for its explanation.

The machine may be equipped with any suitable planting appliances, and as one instance of suitable mechanism of this sort, we have shown a furrow opener or plow 51 having the lateral wings 52 and fastened upon an adjustable beam 53 which is pivotally mounted upon a standard 54 depending from the frame 1. This beam 53 may be yieldingly supported by a spring 55 on the end of a crank lever 56 fast to the frame, and connected by a link 57 with an operating lever 58 erected on the main frame adjacent to the driver's seat 59, so that the plow may be raised and lowered as required. Attached to the beam 53 are bars 60 provided with coverers 61. The countershaft 22 may be provided with a sprocket wheel 62 which is connected by chain 63 with a sprocket wheel 64 on the shaft forming part of the double cutting box mechanism, and serving to drive such shaft. Axle 2 may be provided with a clutch 65 by which the mechanism may be rendered operative or inoperative at pleasure.

The operation is as follows:—The potatoes to be planted are put into the hopper in any quantity, and then the elevator and conveyer are set in motion. Each time one of the carriers 15 of the elevator approaches the opening 7 it comes into contact with the gate 8 therein and forces said gate open against the tension of its spring 10, so that the carrier may enter the hopper, immediately after which the gate is restored automatically to its closing position by the spring 10. As the carrier is moved upward through the potatoes, it will carry one or more of the potatoes up through its trough, and at or before reaching the high point of the sprocket wheel 18 the potatoes will be rolled off onto the horizontal portion of the conveyer 25, due to the absence of the inside strip and the presence of the guard 14 of the elevator 13. After the conveyer leaves the receiving box formed by the walls 38, 39, 40, any surplus potatoes carried by said conveyer will fall back into the hopper, due to the curved formation of the carriers 29. These carriers are so spaced along the chain that there is room between them for only one potato. The sides 37 are so spaced at each side of the conveyer that there is just room for one potato to pass. Any surplus potatoes carried by the conveyer from the receiving box must necessarily lie on top of its carriers, and, therefore, just as soon as these surplus potatoes leave the receiving box they will roll off over the sides into the hopper, and consequently it is impossible for surplus potatoes to be carried along by the conveyer to the cutting mechanism. It is to be emphasized, therefore, that when each carrier 29 reaches the sprocket wheel 28, there is one and only one potato to each space between adjacent carriers. Inasmuch as the sprocket wheel 28 has an intermittent motion, such that each motion will advance the chain 25 a distance equal to the space between any two adjacent carriers, it follows that for each motion a potato will be delivered. One motion of the sprocket wheel 28 will deliver the first potato into the tilting receiver 41, inasmuch as the receiver is in its horizontal receiving position, and the receiver will be immediately tilted to discharge it into an appropriate part of the cutting box, and the next motion of the sprocket wheel will deliver the second potato beneath the elevated end of the receiver and directly above that part of the cutting box that is beneath the uplifted end. Practically the two potatoes are delivered to the respective cutting boxes at about the same time.

It will be noted that the number of teeth on the sprocket wheel 28, and the number of teeth on the ratchet 31, and the number of points on cam 48, and the number of links of chain between carriers 29, must have a definite relation to each other. In our construction we prefer to have twelve teeth on the sprocket wheel, four teeth on the ratchet, two points on the cam, and three links between the carriers aforesaid, in order to insure the proper timing of the parts.

As already stated, the double cutting box or double cutting apparatus and its accessories remain as the subject-matter of the parent case, but for purposes of reference it is noted that the double cutting box is shown in both Fig. 1 and Fig. 2 of the present drawings and indicated generally by the letter A. For a full description of the preferred form of cutting box reference is made to the parent case.

We have thus described one practical embodiment of the invention, but wish to be understood as not limiting our invention to the details of construction, excepting as such details are claimed in the claims hereinafter made.

What we claim is:

1. In a potato planter having a double cutting box, the combination of a hopper, an elevator in said hopper, an endless traveling conveyer to receive the potatoes from the elevator and carry them to the cutting box, and means interposed between the conveyer and the cutting box to receive a potato from the conveyer and deliver it to one side of the cutting box and to allow another potato to drop directly from the conveyer into the other side of the cutting box.

2. In a potato planter having a double cutting box, the combination of a hopper, an elevator therein, an endless traveling conveyer extending from front to rear of the hopper and alongside of the elevator, means for diverting the potatoes from the elevator to the conveyer, means to insure the conveyance of one potato at a time and the return of others to the hopper, a receiver interposed between one end of the conveyer and the top of the cutting box, and means to operate the elevator, conveyer and receiver so as to insure the delivery of the potatoes one at a time successively to one side of the cutting box and then to the other.

3. In a potato planter having a double cutting apparatus, adapted to cut two potatoes at a time, the combination of a hopper for the potatoes, means comprising endless traveling carrier chains to transfer the potatoes one at a time from the hopper to the cutting apparatus, and a tilting receiver interposed between the delivery end of the transferring means and the cutting apparatus to positively deliver one potato to one part of the cutting apparatus and simultaneously permit the delivery of another potato to the other part of the cutting apparatus.

4. In a potato planter having a double cutting apparatus, the combination of a potato supplying medium, including an endless traveling conveyer adapted to deliver one potato at a time to the double cutting apparatus and a tilting receiver interposed between the delivery end of the conveyer and the mouth of the double cutting apparatus and adapted when tilted to discharge a potato from the conveyer directly into one portion of the cutting apparatus and to permit the substantially coincident delivery of the next potato from the conveyer directly into the other portion of the cutting apparatus while the receiver is tilted and beneath the uppermost end of the tilted receiver.

5. In a potato planter, the combination with a hopper, of an elevator therein, an endless traveling conveyer arranged at one side of said elevator, and means at the opposite side of said elevator for diverting the potatoes laterally from said elevator to said conveyer.

6. In a potato planter, the combination with a hopper, of an elevator therein adapted to raise the potatoes out of the hopper, an endless traveling conveyer arranged above said hopper and at one side of said elevator, and means comprising a guard arranged at the opposite side of said elevator for diverting the potatoes laterally from the elevator to said conveyer.

In testimony whereof we have hereunto set our hands this 22 day of July, A. D. 1915.

ALVIN D. WELKER.
LIONEL E. SNYDER.

Witnesses:
H. G. GRIESMER,
A. M. BECK.

Copies of this patent may be obtained for five cents each, by addressing the "Commissioner of Patents, Washington, D. C."